United States Patent
Cheung

(10) Patent No.: US 7,233,418 B2
(45) Date of Patent: Jun. 19, 2007

(54) CALIBRATION METHOD FOR QUICK SCANNING STARTS

(75) Inventor: Nigel M-F Cheung, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1130 days.

(21) Appl. No.: 09/858,079

(22) Filed: May 15, 2001

(65) Prior Publication Data

US 2002/0171819 A1 Nov. 21, 2002

(51) Int. Cl.
*H04N 1/00* (2006.01)

(52) U.S. Cl. ............... 358/406; 358/504; 358/505; 358/474; 358/509; 399/51

(58) Field of Classification Search ........... 358/504, 358/406, 505, 506, 474, 509, 1.15; 399/51; 250/235, 559.1; 348/96; 347/255; 702/150; 398/34
See application file for complete search history.

(56) References Cited

U.S. PATENT DOCUMENTS

| | | | | |
|---|---|---|---|---|
| 4,602,291 A * | 7/1986 | Temes | .......................... | 348/243 |
| 4,605,970 A * | 8/1986 | Hawkins | ..................... | 358/406 |
| 4,996,605 A * | 2/1991 | Taniguchi et al. | .......... | 358/474 |
| 5,153,745 A * | 10/1992 | Brandkamp et al. | ........ | 358/406 |
| 5,237,172 A * | 8/1993 | Lehman et al. | ............. | 250/235 |
| 5,285,293 A | 2/1994 | Webb et al. | ................. | 358/471 |
| 5,369,423 A * | 11/1994 | Hunter et al. | ................ | 347/255 |
| 5,384,699 A * | 1/1995 | Levy et al. | ............ | 250/363.03 |
| 5,404,232 A * | 4/1995 | Selby | .......................... | 358/406 |
| 5,424,537 A * | 6/1995 | Lehman et al. | ............. | 250/235 |
| 5,506,695 A * | 4/1996 | North | ......................... | 358/474 |
| 5,541,645 A * | 7/1996 | Davis | .......................... | 348/96 |
| 5,907,742 A * | 5/1999 | Johnson et al. | ............... | 399/51 |
| 5,982,957 A * | 11/1999 | DeCaro et al. | ............. | 382/312 |
| 6,011,636 A * | 1/2000 | Tanaka et al. | .............. | 358/527 |
| 6,172,772 B1 * | 1/2001 | Steinle et al. | ............... | 358/406 |
| 6,222,648 B1 * | 4/2001 | Wolf et al. | ................. | 358/504 |
| 6,327,047 B1 * | 12/2001 | Motamed | .................... | 358/1.15 |
| 6,344,910 B1 * | 2/2002 | Cao | ............................. | 398/34 |
| 6,462,772 B1 * | 10/2002 | Bryant | ........................ | 348/96 |
| 6,518,587 B2 * | 2/2003 | Rombola | ................. | 250/559.1 |
| 6,606,171 B1 * | 8/2003 | Renk et al. | .................. | 358/475 |
| 6,654,493 B1 * | 11/2003 | Hilliard et al. | ............ | 382/167 |
| 6,900,448 B1 * | 5/2005 | Thompson | ............... | 250/559.1 |
| 7,023,581 B2 * | 4/2006 | Soler et al. | .................. | 358/1.9 |
| 2001/0030774 A1 * | 10/2001 | Bromley | ..................... | 358/474 |
| 2002/0013675 A1 * | 1/2002 | Knoll et al. | ................ | 702/150 |
| 2002/0097446 A1 * | 7/2002 | Lee | .............................. | 358/406 |
| 2002/0122213 A1 * | 9/2002 | Hill et al. | .................... | 358/474 |
| 2002/0140996 A1 * | 10/2002 | Spears et al. | ............... | 358/504 |
| 2002/0154325 A1 * | 10/2002 | Holub | ........................ | 358/1.9 |
| 2003/0112480 A1 * | 6/2003 | Chiu | .......................... | 358/504 |
| 2004/0130739 A1 * | 7/2004 | Adam et al. | .................. | 358/1.9 |
| 2004/0207886 A1 * | 10/2004 | Spears | ........................ | 358/474 |
| 2005/0185227 A1 * | 8/2005 | Thompson | .................. | 358/474 |

* cited by examiner

*Primary Examiner*—Kimberly Williams
*Assistant Examiner*—Beniyam Menberu

(57) ABSTRACT

A method for calibrating a scanner that allows the scan to start quickly.

17 Claims, 2 Drawing Sheets

LIGHT INTENSITY

CCD PIXEL POSITION

LIGHT INTENSITY

CCD PIXEL POSITION

CALIBRATION METHOD FOR QUICK SCANNING STARTS

FIELD OF THE INVENTION

The present invention relates generally to digital scanners and more specifically to a calibration method for quick scanning starts.

BACKGROUND OF THE INVENTION

Scanners typically use a CCD to transform an image into digital information. CCD's typically have sensitivity variations between the different cells or pixels in the CCD array. These non-uniformity's are typically corrected by doing a calibration scan before each user scan. Calibration scans typically correct for two types of non-uniformity, dark current and photo response non-uniformity. Dark current is the leakage current occurring in the CCD even when no light is hitting the CCD. Photo response non-uniformity is the variation in sensitivity between pixels to a constant amount of light hitting the CCD. Typically these problems are corrected by doing two scans, one with the light off, and one with the light on using a reference target of a known brightness. A calibration scan is described in U.S. Pat. No. 5,285,293 "Method and apparatus for providing sensor compensation" which is hereby incorporated by reference.

Currently these calibration scans take time, typically between 1 to 5 seconds. The total time is dependent on a number of factors. Some of the factors are: if the scanner light is turned off for dark noise calibration, how far the scan head must move to reach the calibration target, and how long the lamp takes to reach scanning intensity. In the past the calibration time was a small percentage of the total scan time. However with the increased speed of input/output channels, computers, and scanners, calibration scan times are becoming a larger percentage of the total scan time.

Today, some scanners turn off the scanner light at the end of each scan and other scanners leave the scan light on for extended periods of time. The trade off is the amount of energy used vs. the time it takes to turn on the light and reach a stable scanning intensity. The scanners that leave their lights on typically start scanning quicker than scanners that have to turn on their light first before they can scan. Typically the scanners that leave their light on use the same stored dark current calibration for each scan.

Currently scanners typically either do a calibration scan before each user scan or do one calibration scan at power-up and reuse this saved calibration scan. The scanners that do a calibration scan before each user scan, typically take longer to start the user scan than the scanners that just do one calibration scan at power-up. However, the saved calibration scan may not be as accurate as the calibration scan done before each user scan. This is because the lamp intensity profile can change over time and the temperature of the CCD can change over time. The calibration scan typically is used to correct lamp profiles as well as photo response non-uniformity and changes in the temperature of the CCD affect the amount of dark current.

Therefore there is a need for a calibration method that is accurate and still allows quick scan starts.

SUMMARY OF THE INVENTION

A method for calibrating a scanner that allows the scan to start quickly.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

A method for calibrating a scanner that allows the scan to start quickly can enhance the usability of current scanners. A calibration typically corrects for at least three things: dark current, photo-response non-uniformity (PRNU), and lamp intensity profile problems. These three error sources are typically measured with two scans. A scan is done where essentially no light is hitting the CCD to measure the dark current. And a scan of a target of a known brightness, done with the light on, is used to measure the PRNU and the lamp profile. For this application, the scan done to measure the PRNU and lamp profile will be called the PRNU scan. Once each of these sources of error are measured, correcting gain factors are stored in memory and used to adjust the gain for the amplifier for each pixel in the CCD array. Some scanners keep the scan light on in-between user scans. These scanners typically only do a dark current scan at power-up and then re-use the stored dark current correction factors. Some of these scanners may redo the PRNU scan before each user scan. This may not be considered a full calibration. For this application a full calibration will consist of both a dark current scan and a PRNU scan.

PRNU scans use a target of known brightness. There is a chance that these targets may become dirty or dusty over time. Any dirt or dust would make the target look darker than normal and cause an offsetting correction gain to be loaded into memory. This would cause a streak in any user scans done with these correction gains in memory. To overcome these problems, scanners typically scan the PRNU target using a low Y-resolution. The Y-axis of a scanner is typically along the direction of scan head or carriage movement. The low Y-resolution causes longer strips of the target to be used, minimizing the effect of small dust or dirt particles. To do a low Y-resolution scan the CCD must be moved across the area to be scanned during the CCD exposure time, typically this is done by moving the scan head or carriage relative to the reference target. The lower the resolution desired for a given CCD exposure time, the faster the scan head must move relative to the reference target. Another way to achieve low Y-resolution is to average a number of scan lines together. In either case the scan head must be moved across the area of the reference target to be scanned. In this application, unless stated otherwise, a PRNU scan will include moving the scan head relative to the reference target. This movement takes time. In addition the scan head may need to be repositioned after the PRNU scan has been completed. This takes even more time.

Figure 1:
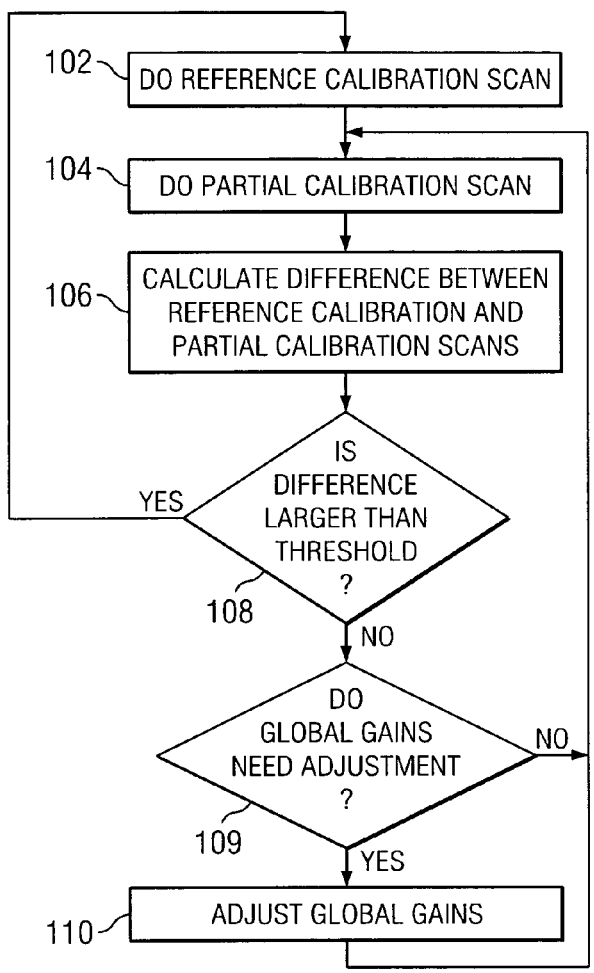
FIG. 1 is a flow chart of a method of calibrating a scanner in accordance with the present invention.

In one embodiment of the current invention the scanner would do a full calibration some time shortly after the scanner was turned on (see FIG. 1). The scan head would then be positioned underneath the PRNU reference target. In the preferred embodiment the PRNU reference target would extend far enough such that when the scan head is at the normal starting position for a user scan, the scan head would still be under the PRNU reference target. This would allow the scan head to be positioned in the starting position for a user scan while still being underneath the PRNU reference target. The scanner would occasionally do partial calibration scan 104.

A partial calibration scan can be done in a number of ways depending on if the scanner light is currently on or off. When a partial calibration scan is to be done and the scanner light is currently on, the scanner can do a PRNU scan without doing a dark current scan. This way the scanner does not need to turn off the scanner light. Because the light is not turned off the light does not need to be re-stabilized after turning the light back on. Turning a scanner light on and stabilizing the light takes time. Another way a partial calibration scan can be done when the light is off is by doing the scans without moving the scan head. Because the scan head does not move, the scans may be as short as a CCD exposure time. A typical CCD exposure time may be as shorts as 4 milliseconds. Because the scan head does not move, there is no need to reposition the scan head back to the normal user scan starting position. In this case the light must be turned on for the PRNU scan. Another way to do a partial calibration scan when the scanner light is already on is to do a PRNU scan without moving the scan head and without doing a dark current scan. The scan head should be under the PRNU reference target to do a PRNU scan without moving the scan head.

Figure 2:
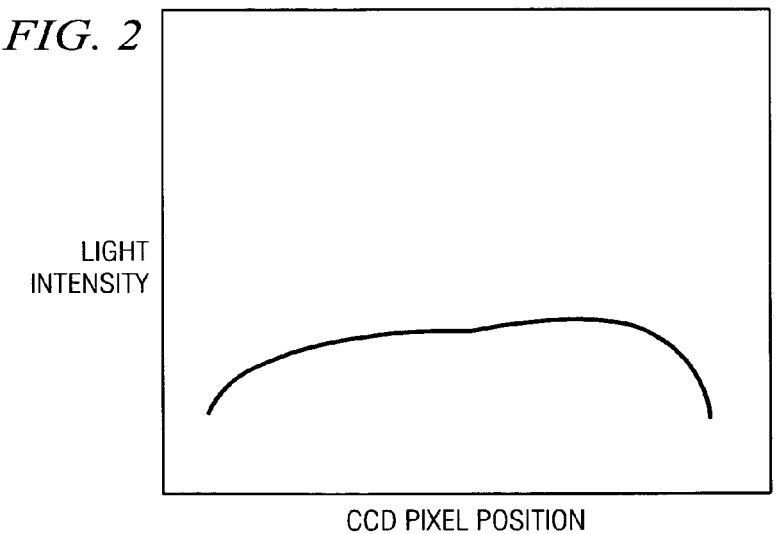
FIG. 2 is a plot of light profile of a scanner after a time X.
Figure 3:
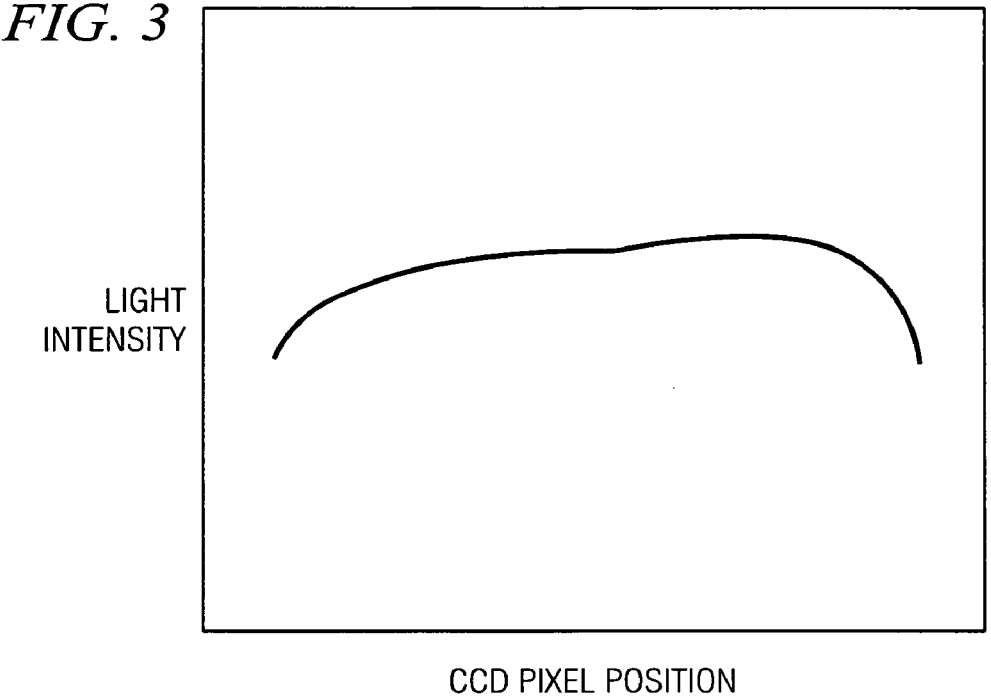
FIG. 3 is a plot of light profile of a scanner after a time Y.
Figure 4:
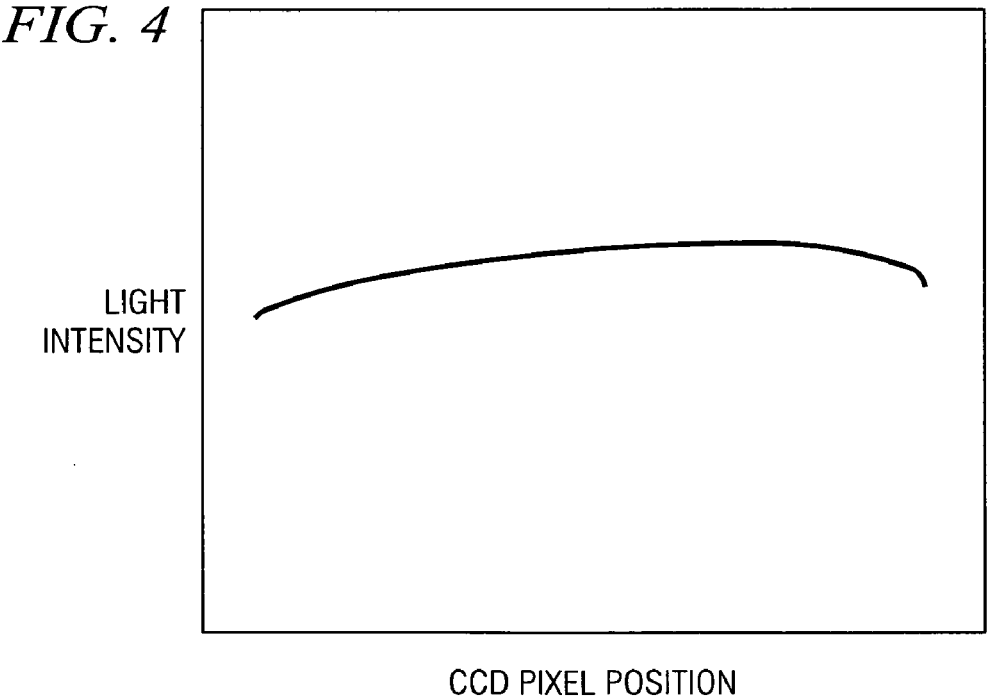
FIG. 4 is a plot of light profile of a scanner after a time Z.

Once the partial calibration scan has been completed the partial calibration scan results are compared to the stored reference calibration scan results 106. If the partial calibration scan has changed more than a preset amount a new full calibration will be done 108. When comparing the reference calibration scan results with the partial calibration scan results, large changes in only a few individual pixels may be discounted. The reason for this is that if the partial calibration scan was done without movement of the scan head, a dust or dirt spot on the PRNU reference target may have a large effect on the results compared to a scan done over a much longer strip of the PRNU reference target. FIG. 2 shows an example lamp profile from a PRNU scan where the x-axis is the pixels in the CCD and the y-axis is light intensity or brightness. FIG. 3 shows another PRNU scan lamp profile. The difference between the lamp profiles in FIG. 2 and FIG. 3 are mostly changes in magnitude. Both lamp profiles have a very similar shape but the lamp profile in FIG. 3 is brighter or has a larger magnitude. This type of difference between the profiles may optionally be corrected 109 by a change in the global gain 110 or no change may be made. However if the difference in brightness between the two profiles exceeds a given amount a new full reference calibration scan may be done. FIG. 4 shows a third lamp profile. The lamp profile in FIG. 4 has a different shape than the lamp profiles in FIGS. 2 and 3. This type of change, if large enough, will also trigger a new reference calibration scan 102. The magnitude or brightness difference may be calculated using many different well-known methods, for example the average, the mean, or the minimum difference between the profiles may be used. The shape difference can also be calculated using many different well-known methods. For example the least squares method, the maximum difference—minimum difference between the profiles, and the cross-correlation method are methods that could be used to determine the differences between shapes.

By following the process of occasionally doing a partial calibration scan, and when needed, re-doing the full calibration scan, the scanner is always ready to start a user scan without having to wait to do a calibration scan. There are a number of ways that the scanner can use to decide when to do a partial calibration scan. One way is time based. The scanner can do the partial calibration scan at the end of a given time period. Another time-based method could be based on the lamp warm-up characteristic. Typically the longer the lamp has been on the more stable the lamp profile and temperature is. Using this information the partial calibration scans may be more frequent when the lamp has first been turned on. After the lamp has been on for some time the partial calibration scan may occur less frequently. Another way is temperature based. The scanner may have a way to measure temperature, for example a thermal couple. Another way to measure temperature is to use dark current from a CCD element that is covered such that no light can hit the CCD element. The change in dark current is proportional to the change in temperature. By measuring the dark current, the temperature of the CCD can be determined and if the temperature changes more than a given amount a partial calibration scan can be done.

In another embodiment of the current invention the scanner would do a full calibration scan sometime after power on. The scanner would then occasionally do a partial calibration scan. When it was determined that a new reference scan was needed, the scanner would not do a full calibration scan, but instead would only do a PRNU scan. The new PRNU scan would replace the PRNU information from the full calibration scan. The dark current information from the full calibration may be re-used. In this embodiment the scanner light does not need to be turned off when re-doing the reference scan.

In another embodiment of the current invention the scanner would only do a PRNU calibration scan sometime after power on. The scanner would then occasionally do a partial calibration scan. When it was determined that a new reference scan was needed, the scanner would re-do the PRNU scan. The new PRNU scan would replace the PRNU information from the first reference scan. In this embodiment the scanner light does not need to be turned off when re-doing the reference scan The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of calibrating a scanner, comprising the steps of:

performing a full calibration scan;

performing at least one partial calibration scan;

comparing the full calibration scan to the partial calibration scan;

re-performing the full calibration scan when the difference between the partial calibration scan and the full calibration scan is at least equal to a predetermined amount.

2. The method of claim 1 where the partial calibration scan does not move the scan head.

3. The method of claim 1 where the partial calibration scan does not turn off the scanner lamp.

4. The method of claim 1 where the partial calibration scan is done periodically.

5. The method of claim 4 where the period between partial calibration scans is based on time.

6. The method of claim 4 where the period between partial calibration scans is based on temperature.

7. A method of calibrating a scanner, comprising the steps of:
performing a full calibration scan;
performing at least one partial calibration scan without moving the scan head;
comparing the full calibration scan to the partial calibration scan;
adjusting the gains globally for the full calibration scan when the difference between the partial calibration scan and the full calibration scan is less than a predetermined amount.

8. The method of claim 7 where the partial calibration scan does not turn off the scanner lamp.

9. The method of claim 7 where the partial calibration scan is done periodically.

10. The method of claim 9 where the period between partial calibration scans is based on time.

11. The method of claim 9 where the period between partial calibration scans is based on temperature.

12. A method of calibrating a scanner, comprising the steps of:
performing a full calibration scan and storing the results as a reference scan;
performing at least one partial calibration scan without moving the scan head;
comparing the reference scan to the partial calibration scan;
performing a PRNU calibration scan and storing the results as a reference scan when the difference between the partial calibration scan and the reference scan is at least equal to a predetermined amount.

13. The method of claim 12 where the partial calibration scan is done periodically.

14. A method of calibrating a scanner, comprising the steps of:
performing a full calibration scan and storing the results as a reference scan;
performing at least one partial calibration scan without moving the scan head;
comparing the reference scan to the partial calibration scan;
adjusting the gains globally for the reference scan when the difference between the partial calibration scan and the reference calibration scan is less than a predetermined amount.

15. The method of claim 14 where the partial calibration scan is done periodically.

16. A method of calibrating a scanner, comprising the steps of:
performing a PRNU calibration scan and storing the results as a reference scan;
performing at least one partial calibration scan without moving the scan head;
comparing the reference scan to the partial calibration scan;
re-performing the PRNU calibration scan when the difference between the partial calibration scan and the reference scan is at least equal to a predetermined amount.

17. The method of claim 16 where the partial calibration scan is done periodically.

* * * * *